(12) United States Patent
Rothschillwe et al.

(10) Patent No.: US 7,617,444 B2
(45) Date of Patent: Nov. 10, 2009

(54) FILE FORMATS, METHODS, AND COMPUTER PROGRAM PRODUCTS FOR REPRESENTING WORKBOOKS

(75) Inventors: Chad B. Rothschillwe, Edmonds, WA (US); Su-Piao B. Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 11/018,912

(22) Filed: Dec. 20, 2004

(65) Prior Publication Data

US 2006/0136433 A1 Jun. 22, 2006

(51) Int. Cl.
*G06F 17/00* (2006.01)
(52) U.S. Cl. .................. 715/213; 715/200; 715/201; 715/209; 715/214; 715/215; 715/216; 715/217; 715/218; 715/219; 715/220; 715/234; 715/272
(58) Field of Classification Search ............... 715/500.1, 715/503, 504, 200, 201, 209, 212–220, 234, 715/272
See application file for complete search history.

(56) References Cited

U.S. PATENT DOCUMENTS

| | | | |
|---|---|---|---|
| 4,410,286 A | 10/1983 | Ko et al. |
| 4,594,674 A | 6/1986 | Boulia et al. |
| 4,649,513 A | 3/1987 | Martin et al. |
| 4,870,611 A | 9/1989 | Martin et al. |
| 5,222,205 A | 6/1993 | Larson et al. |
| 5,267,155 A | 11/1993 | Buchanan et al. |
| 5,469,533 A | 11/1995 | Dennis |
| 5,487,138 A | 1/1996 | Rust et al. |
| 5,537,526 A | 7/1996 | Anderson et al. |
| 5,579,466 A | 11/1996 | Habib et al. |

(Continued)

FOREIGN PATENT DOCUMENTS

EP 1 376 387 A2 1/2004

(Continued)

OTHER PUBLICATIONS

OpenOffice.org, "OpenOffice.org User Guide for Version 1.1.x: Chapter 4: Spreadsheets in Calc", published May 7, 2004, pp. 1,2,179-254, http://documentation.openoffice.org/manuals/OOo1.x.x/user_guide.pdf.*

(Continued)

*Primary Examiner*—Stephen S Hong
*Assistant Examiner*—David Faber
(74) *Attorney, Agent, or Firm*—Merchant & Gould P.C.

(57) ABSTRACT

File formats, methods, and computer program products are provided for representing a workbook in a modular content framework. The modular content framework may include a file format container associated with modular parts. A file format includes logically separate modular parts that are associated with each other by one or more relationships where each modular part is associated with a relationship type. The modular parts include a workbook part operative as a guide for properties of the workbook and a worksheet part associated with the workbook part and operative to specify a definition of cells within a worksheet associated with the worksheet part. The modular parts may also include a document properties part containing built-in properties associated with the file format and a thumbnail part containing associated thumbnails. Each modular part is capable of being interrogated separately, extracted from the workbook, and/or reused in a different workbook.

18 Claims, 6 Drawing Sheets

U.S. PATENT DOCUMENTS

| | | | |
|---|---|---|---|
| 5,579,519 | A | 11/1996 | Pelletier |
| 5,613,124 | A | 3/1997 | Atkinson et al. |
| 5,655,130 | A | 8/1997 | Dodge et al. |
| 5,675,788 | A | 10/1997 | Husick et al. |
| 5,701,342 | A | 12/1997 | Anderson et al. |
| 5,745,910 | A | 4/1998 | Piersol et al. |
| 5,752,055 | A | 5/1998 | Redpath et al. |
| 5,752,056 | A | 5/1998 | Celik |
| 5,819,295 | A | 10/1998 | Nakagawa et al. |
| 5,845,058 | A | 12/1998 | Shaw et al. |
| 5,893,109 | A | 4/1999 | DeRose et al. |
| 5,903,903 | A | 5/1999 | Kennedy |
| 5,903,905 | A | 5/1999 | Andersen et al. |
| 5,905,504 | A | 5/1999 | Barkans et al. |
| 5,911,776 | A | 6/1999 | Guck |
| 5,950,215 | A | 9/1999 | Tabuchi |
| 5,960,168 | A | 9/1999 | Shaw et al. |
| 5,993,088 | A | 11/1999 | Nogay et al. |
| 6,023,714 | A | 2/2000 | Hill et al. |
| 6,026,416 | A | 2/2000 | Kanerva et al. |
| 6,067,531 | A | 5/2000 | Hoyt et al. |
| 6,094,665 | A | 7/2000 | Lyons et al. |
| 6,134,552 | A | 10/2000 | Fritz et al. |
| 6,144,974 | A | 11/2000 | Gartland |
| 6,175,845 | B1 | 1/2001 | Smith et al. |
| 6,182,080 | B1 | 1/2001 | Clements |
| 6,182,096 | B1 | 1/2001 | Mastie et al. |
| 6,199,082 | B1 | 3/2001 | Ferrel et al. |
| 6,212,530 | B1 | 4/2001 | Kadlec |
| 6,247,018 | B1 | 6/2001 | Rheaume |
| 6,247,066 | B1 | 6/2001 | Tanaka |
| 6,269,403 | B1 | 7/2001 | Anders et al. |
| 6,342,904 | B1 | 1/2002 | Vasudevan et al. |
| 6,362,870 | B2 | 3/2002 | Mui et al. |
| 6,393,441 | B1 | 5/2002 | Kanerva et al. |
| 6,407,821 | B1 | 6/2002 | Hohensee et al. |
| 6,418,448 | B1 | 7/2002 | Sarkar |
| 6,449,653 | B2 | 9/2002 | Klemets et al. |
| 6,457,017 | B2 | 9/2002 | Watkins et al. |
| 6,480,206 | B2 | 11/2002 | Prinzing |
| 6,484,189 | B1 | 11/2002 | Gerlach, Jr. et al. |
| 6,496,206 | B1 * | 12/2002 | Mernyk et al. ............... 715/835 |
| 6,507,856 | B1 | 1/2003 | Kanerva et al. |
| 6,509,974 | B1 | 1/2003 | Hansen |
| 6,538,760 | B1 | 3/2003 | deBry et al. |
| 6,549,918 | B1 | 4/2003 | Probert, Jr. et al. |
| 6,583,789 | B1 | 6/2003 | Carlson et al. |
| 6,591,278 | B1 | 7/2003 | Ernst |
| 6,604,144 | B1 | 8/2003 | Anders |
| 6,608,693 | B1 | 8/2003 | Loyd et al. |
| 6,609,200 | B2 | 8/2003 | Anderson et al. |
| 6,654,737 | B1 | 11/2003 | Nunez |
| 6,657,647 | B1 | 12/2003 | Bright |
| 6,658,477 | B1 | 12/2003 | Lisitsa et al. |
| 6,674,540 | B1 | 1/2004 | Wiechers et al. |
| 6,675,353 | B1 | 1/2004 | Friedman |
| 6,675,356 | B1 | 1/2004 | Adler et al. |
| 6,681,223 | B1 | 1/2004 | Sundaresan |
| 6,694,485 | B1 | 2/2004 | Kelley et al. |
| 6,715,126 | B1 | 3/2004 | Chang et al. |
| 6,763,343 | B1 | 7/2004 | Brooke et al. |
| 6,771,291 | B1 | 8/2004 | DiStefano, III |
| 6,781,609 | B1 | 8/2004 | Barker et al. |
| 6,785,673 | B1 | 8/2004 | Fernandez |
| 6,789,229 | B1 | 9/2004 | Dunietz et al. |
| 6,812,941 | B1 | 11/2004 | Brown et al. |
| 6,871,321 | B2 | 3/2005 | Wakayama |
| 6,910,843 | B2 | 6/2005 | Saw et al. |
| 6,912,555 | B2 | 6/2005 | Lemon et al. |
| 6,918,082 | B1 | 7/2005 | Gross et al. |
| 6,925,597 | B2 | 8/2005 | Anwar |
| 6,925,631 | B2 | 8/2005 | Golden |
| 6,931,590 | B2 | 8/2005 | Kanie et al. |
| 6,938,203 | B1 | 8/2005 | Dimarco et al. |
| 6,941,510 | B1 | 9/2005 | Ozzie et al. |
| 6,952,801 | B2 | 10/2005 | Warmus et al. |
| 6,961,902 | B2 | 11/2005 | Anecki et al. |
| 6,981,207 | B1 | 12/2005 | Bakman et al. |
| 6,993,527 | B1 | 1/2006 | Raman et al. |
| 7,036,076 | B2 | 4/2006 | Anwar |
| 7,051,276 | B1 | 5/2006 | Mogilevsky et al. |
| 7,054,841 | B1 | 5/2006 | Tenorio |
| 7,080,083 | B2 | 7/2006 | Kim et al. |
| 7,134,071 | B2 | 11/2006 | Ohwada et al. |
| 7,168,035 | B1 | 1/2007 | Bell et al. |
| 7,171,618 | B2 | 1/2007 | Harrington et al. |
| 7,290,205 | B2 | 10/2007 | Moncsko et al. |
| 7,301,544 | B2 | 11/2007 | Yuan |
| 7,412,649 | B2 | 8/2008 | Emek et al. |
| 7,418,652 | B2 | 8/2008 | Ornstein et al. |
| 7,487,448 | B2 | 2/2009 | Emerson et al. |
| 7,549,118 | B2 | 6/2009 | Shur et al. |
| 2001/0003828 | A1 | 6/2001 | Peterson et al. |
| 2001/0013043 | A1 | 8/2001 | Wagner |
| 2001/0016842 | A1 | 8/2001 | Umen et al. |
| 2001/0018697 | A1 | 8/2001 | Kunitake et al. |
| 2001/0034739 | A1 | 10/2001 | Anecki et al. |
| 2001/0039552 | A1 | 11/2001 | Killi et al. |
| 2001/0044809 | A1 | 11/2001 | Parasnis et al. |
| 2001/0044813 | A1 | 11/2001 | Frank |
| 2001/0051962 | A1 | 12/2001 | Plotkin |
| 2001/0054042 | A1 | 12/2001 | Watkins et al. |
| 2002/0004805 | A1 | 1/2002 | Nojima et al. |
| 2002/0016800 | A1 | 2/2002 | Spivak et al. |
| 2002/0038348 | A1 | 3/2002 | Malone et al. |
| 2002/0049790 | A1 | 4/2002 | Ricker et al. |
| 2002/0059265 | A1 | 5/2002 | Valorose |
| 2002/0059337 | A1 | 5/2002 | Takaoka et al. |
| 2002/0065848 | A1 | 5/2002 | Walker et al. |
| 2002/0065857 | A1 | 5/2002 | Michalewicz |
| 2002/0073236 | A1 | 6/2002 | Helgeson et al. |
| 2002/0087602 | A1 | 7/2002 | Masuda et al. |
| 2002/0099797 | A1 | 7/2002 | Merrell et al. |
| 2002/0103835 | A1 | 8/2002 | Kearney |
| 2002/0107886 | A1 | 8/2002 | Gentner et al. |
| 2002/0111133 | A1 | 8/2002 | Wittkotter |
| 2002/0116421 | A1 | 8/2002 | Fox et al. |
| 2002/0120647 | A1 | 8/2002 | Amano |
| 2002/0129058 | A1 | 9/2002 | Story et al. |
| 2002/0174145 | A1 | 11/2002 | Duga et al. |
| 2002/0184263 | A1 | 12/2002 | Perinet et al. |
| 2002/0188638 | A1 | 12/2002 | Hamscher |
| 2002/0194220 | A1 | 12/2002 | Sluiman |
| 2003/0004957 | A1 | 1/2003 | Broman et al. |
| 2003/0023637 | A1 | 1/2003 | Halahmi |
| 2003/0028560 | A1 | 2/2003 | Kudrolli et al. |
| 2003/0033287 | A1 | 2/2003 | Shanahan et al. |
| 2003/0065946 | A1 | 4/2003 | Holliday et al. |
| 2003/0074633 | A1 | 4/2003 | Boulmakoul et al. |
| 2003/0079181 | A1 | 4/2003 | Schumacher et al. |
| 2003/0093520 | A1 | 5/2003 | Beesley |
| 2003/0115547 | A1 | 6/2003 | Ohwada et al. |
| 2003/0120671 | A1 | 6/2003 | Kim et al. |
| 2003/0126136 | A1 | 7/2003 | Omoigui |
| 2003/0126260 | A1 | 7/2003 | Husain et al. |
| 2003/0137539 | A1 | 7/2003 | Dees |
| 2003/0137691 | A1 | 7/2003 | Tanaka |
| 2003/0142128 | A1 | 7/2003 | Reulein et al. |
| 2003/0145134 | A1 | 7/2003 | Wehage et al. |
| 2003/0149934 | A1 | 8/2003 | Worden .................... 715/513 |
| 2003/0149935 | A1 | 8/2003 | Takizawa et al. ............ 715/513 |
| 2003/0158851 | A1 | 8/2003 | Britton et al. |
| 2003/0163552 | A1 | 8/2003 | Savitzky et al. |
| 2003/0167446 | A1 | 9/2003 | Thomas .................... 715/513 |

| | | |
|---|---|---|
| 2003/0172168 A1 | 9/2003 | Mak et al. |
| 2003/0172343 A1 | 9/2003 | Leymaster et al. |
| 2003/0177446 A1 | 9/2003 | Gropper et al. |
| 2003/0177449 A1 | 9/2003 | Rose .................... 715/530 |
| 2003/0182450 A1 | 9/2003 | Ong et al. |
| 2003/0182656 A1 | 9/2003 | Leathers et al. |
| 2003/0195784 A1 | 10/2003 | Smith |
| 2003/0196176 A1 | 10/2003 | Abu-Ghazalah et al. |
| 2003/0221167 A1 | 11/2003 | Goldstein et al. ......... 715/513 |
| 2003/0222890 A1 | 12/2003 | Salesin et al. |
| 2003/0229845 A1 | 12/2003 | Salesin et al. |
| 2003/0233420 A1 | 12/2003 | Stark et al. |
| 2003/0237048 A1 | 12/2003 | Jones et al. |
| 2003/0237049 A1 | 12/2003 | Sawicki et al. |
| 2004/0003343 A1 | 1/2004 | Liao et al. |
| 2004/0003388 A1 | 1/2004 | Jacquemot et al. |
| 2004/0015782 A1 | 1/2004 | Day et al. |
| 2004/0015890 A1 | 1/2004 | Wong et al. |
| 2004/0015908 A1 | 1/2004 | Giel et al. |
| 2004/0019853 A1 | 1/2004 | Takizawa et al. ........... 715/523 |
| 2004/0030711 A1 | 2/2004 | Roudot |
| 2004/0030987 A1 | 2/2004 | Manelli |
| 2004/0034848 A1 | 2/2004 | Moore et al. |
| 2004/0049737 A1 | 3/2004 | Simon et al. |
| 2004/0054669 A1 | 3/2004 | Seyrat et al. |
| 2004/0054697 A1 | 3/2004 | Brandenberger |
| 2004/0066527 A1 | 4/2004 | Kloosterman et al. |
| 2004/0078755 A1 | 4/2004 | Shinjo et al. |
| 2004/0088332 A1 | 5/2004 | Lee et al. |
| 2004/0103073 A1 | 5/2004 | Blake et al. |
| 2004/0117733 A1 | 6/2004 | Moreau et al. |
| 2004/0128535 A1 | 7/2004 | Cheng |
| 2004/0128623 A1 | 7/2004 | Hudson |
| 2004/0139049 A1 | 7/2004 | Hancock et al. |
| 2004/0148278 A1 | 7/2004 | Milo et al. |
| 2004/0148567 A1 | 7/2004 | Jeon et al. |
| 2004/0153467 A1 | 8/2004 | Conover et al. |
| 2004/0172584 A1 | 9/2004 | Jones et al. |
| 2004/0172592 A1 | 9/2004 | Collie et al. |
| 2004/0181753 A1 | 9/2004 | Michaelides |
| 2004/0183837 A1 | 9/2004 | Watanabe et al. |
| 2004/0194025 A1 | 9/2004 | Hubert et al. |
| 2004/0205533 A1 | 10/2004 | Lopata et al. |
| 2004/0205539 A1 | 10/2004 | Mak et al. |
| 2004/0205580 A1 | 10/2004 | De Angelis et al. |
| 2004/0205623 A1 | 10/2004 | Weil et al. |
| 2004/0205653 A1 | 10/2004 | Hadfield et al. |
| 2004/0205656 A1 | 10/2004 | Reulein et al. |
| 2004/0216048 A1 | 10/2004 | Brown et al. |
| 2004/0221233 A1 | 11/2004 | Thielen |
| 2004/0226012 A1 | 11/2004 | Awada et al. |
| 2004/0230894 A1 | 11/2004 | Elza et al. |
| 2004/0243551 A1 | 12/2004 | Boone et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0022113 A1 | 1/2005 | Hanlon |
| 2005/0063010 A1 | 3/2005 | Giannetti |
| 2005/0066335 A1 | 3/2005 | Aarts ......................... 719/316 |
| 2005/0071385 A1 | 3/2005 | Rao |
| 2005/0071755 A1 | 3/2005 | Harrington et al. |
| 2005/0091574 A1 | 4/2005 | Maaniitty et al. |
| 2005/0091575 A1 | 4/2005 | Relyea et al. |
| 2005/0099398 A1 | 5/2005 | Garside et al. |
| 2005/0105116 A1 | 5/2005 | Kobashi |
| 2005/0108001 A1 | 5/2005 | Aarskog |
| 2005/0108212 A1 | 5/2005 | Karimisetty et al. ........... 707/3 |
| 2005/0108278 A1 | 5/2005 | Jones et al. |
| 2005/0120061 A1 | 6/2005 | Kraft |
| 2005/0125720 A1 | 6/2005 | Little et al. |
| 2005/0125728 A1 | 6/2005 | Peiro et al. |
| 2005/0132279 A1 | 6/2005 | Relyea et al. |
| 2005/0144556 A1 | 6/2005 | Petersen et al. |
| 2005/0177784 A1 | 8/2005 | Andrews et al. |
| 2005/0192813 A1 | 9/2005 | Richard |
| 2005/0198561 A1 | 9/2005 | McAuley |
| 2005/0204016 A1 | 9/2005 | McAuley |
| 2005/0210026 A1 | 9/2005 | Wood |
| 2005/0223312 A1 | 10/2005 | Erdtmann et al. |
| 2005/0246724 A1 | 11/2005 | Foehr et al. |
| 2005/0248790 A1 | 11/2005 | Ornstein et al. |
| 2005/0249536 A1 | 11/2005 | Sedky et al. |
| 2005/0251739 A1 | 11/2005 | Shur et al. |
| 2005/0251740 A1 | 11/2005 | Shur et al. |
| 2005/0251742 A1 | 11/2005 | Mogilevsky et al. |
| 2005/0268221 A1 | 12/2005 | Shur et al. |
| 2005/0278616 A1 | 12/2005 | Eller |
| 2005/0278626 A1 | 12/2005 | Malik |
| 2006/0010371 A1 | 1/2006 | Shur et al. |
| 2006/0026585 A1 | 2/2006 | Haselden et al. |
| 2006/0031749 A1 | 2/2006 | Schramm et al. |
| 2006/0031758 A1 | 2/2006 | Shur et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0069983 A1 | 3/2006 | Bailey et al. |
| 2006/0075337 A1 | 4/2006 | Jones et al. |
| 2006/0080314 A1 | 4/2006 | Hubert et al. |
| 2006/0080316 A1 | 4/2006 | Gilmore et al. |
| 2006/0080603 A1 | 4/2006 | Bailey et al. |
| 2006/0095834 A1 | 5/2006 | Jeon et al. |
| 2006/0117019 A1 | 6/2006 | Sylthe et al. |
| 2006/0136553 A1 | 6/2006 | Villaron et al. |
| 2006/0136809 A1 | 6/2006 | Fernstrom |
| 2006/0136812 A1 | 6/2006 | Jones et al. |
| 2006/0155529 A1 | 7/2006 | Ludviksson et al. |
| 2006/0168562 A1 | 7/2006 | Emek et al. |
| 2006/0190815 A1 | 8/2006 | Jones et al. |
| 2006/0206794 A1 | 9/2006 | Ornstein et al. |
| 2006/0227150 A1 | 10/2006 | Yuan |
| 2006/0271574 A1 | 11/2006 | Villaron et al. |
| 2006/0277452 A1 | 12/2006 | Villaron et al. |
| 2007/0022128 A1 | 1/2007 | Rothschiller et al. |
| 2007/0061384 A1 | 3/2007 | Harrington et al. |
| 2007/0136443 A1 | 6/2007 | Sah et al. |

FOREIGN PATENT DOCUMENTS

| | | |
|---|---|---|
| EP | 1 452 966 A2 | 11/2004 |
| EP | 1672543 | 11/2005 |
| EP | 1672528 | 12/2005 |
| WO | WO 2006/133053 | 12/2006 |
| ZA | 2005/09350 | 4/2008 |

OTHER PUBLICATIONS

U.S. Appl. No. 11/018,718, filed Dec. 20, 2004, entitled "File Formats, Methods, and Computer Program Products for Representing Documents".

U.S. Appl. No. 11/018,910, filed Dec. 20, 2004, entitled "File Formats, Methods, and Computer Program Products for Representing Presentations".

U.S. Appl. No. 11/019,088, filed Dec. 20, 2004, entitled "Management and Use of Data in a Computer-Generated Document".

U.S. Appl. No. 10/731,900, filed Dec. 9, 2003, entitled "Context Free Document Portions,".

U.S. Appl. No. 11/018,405, filed Dec. 20, 2004, entitled "Context Free Document Portions With Alternate Formats,".

U.S. Appl. No. 11/125,907, filed May 10, 2005, entitled "Structuring an Electronic Document for Efficient Identification and Use of Document Parts,".

U.S. Official Action mailed May 12, 2006 in U.S. Appl. No. 10/731,900, Jones et al., (16 pages).

U.S. Official Action mailed May 14, 2008 in U.S. Appl. No. 10/713,900, Jones et al., (11 pages).

U.S. Official Action mailed Jun. 26, 2008 in U.S. Appl. No. 11/072,659, Bailey et al., (12 pages).

U.S. Official Action mailed Jul. 9, 2008 in U.S. Appl. No. 11/019,088, Bishop et al., (31 pages).

International Search Report, PCT/US06/21673 (WO2006/133053), Jun. 25, 2008, (10 pages).

European Search Report, EP/05111509.5 - 1527 (EP1672543) Nov. 3, 2006, (10 pages).

European Search Report, EP05111549.01 (EP1672528), Jul. 22, 2008, (8 pages).

Brauer M. et al., "Open Office Specification 1.0," Online Publication, Mar. 22, 2004, XP002404030; Retrieved from the Internet: URL:http://www.oasis-open.org/committees/download.php/6037/office-spec-1.0-cd-1.pdf on Oct. 20, 2006; (607 pages).

Anonymous: "Technical note TN2073: Deconstructing A Keynote 1.x Document: Part One - Slides," Online Publication, May 20, 2003, XP002404031, Retrieved from the Internet: URL:http:///developer.apple.com/technotes/tn2002/pdf/tn2073.pdf on Oct. 20, 2006; (34 pages).

Anonymous: "Technical Note 2067: About the Keynote XML File Format (APXL Schema)," Online Publication, Feb. 12, 2003, XP002404032; Retrieved from the Internet: URL:http://developer.apple.com/technotes/tn2002/pdf/tn2067.pdf on Oct. 20, 2006: (29 pages).

Anonymous: "Mulberry Slideshow XML (v 2.1): A User's Guide, " Online Publication, Dec. 7, 2001, XP002404033; Retrieved from the Internet: URL:http://www.mulberrytech.com/slideshow/Mulberry-slideshow.zip on Oct. 20, 2006 (17 pages).

"Comparative Assessment of Open Documents Formats Market Overview - Valoris", 2003, http://europa.eu/int/idabc/en/document/3439, retrieved on Apr. 10, 2008, 40 pp.

"Introduction to SpreadsheetML", Online Helpfile 'Officexmlsdk.CHM' extracted from 'OFFICE2003XMLSCHEMA.EXE', Dec. 5, 2003 http://www.microsoft.com/downloads/details.aspx?familyid=fe118952-3547-420a-a412- 00a2662442d9&displaying=en, retrieved on Apr. 10, 2008, 58 pp.

"Microsoft Announces Availability of Open and Royalty-Free License for Office 2003 XML Reference Schemas" , Nov. 7, 2003, http://www.microsoft.com/presspass/press/2003/nov3/11-17XMLRefSchemaEMEAPR.mspx, retrieved on Apr. 10, 2008, 2 pp.

Meyer, 0. "a Tool - Creating Validated XML Documents on the Fly Using MS Word", Oct. 2002, pp. 113- 121.

Whitmer, R., "Document Object Model (DOM) Level 3 Xpath Specification", W3C, hftp://www.w3.org/TR/DOM-Level-3-XPath/, Feb. 26, 2004, Version 1.0, 18 pp.

Orchard et al. "[Editorial Draft] Versioning XML Languages W3C Proposed TAG Finding", http://www.w3.org/2001/tag/doc/versioning-20031116, Nov. 16, 2003, pp. 1-23.

Stop Typing the Same Thing, Website Documentation and Screendumps, 4Office Automation Inc., http://web.archive.org/web/20020418015130, http://www.4officeautomation.com/ReplyAssistant, copyright 2002, 4 pp. from download software.

Jones, B., "Word XML's Context Free Chunks: Building a Document from Multiple Pieces of Content", http://blogs.msdn.com/brian_jones_archive/2005/07/20/441167.aspx, Jul. 20, 2005, 4 pp.

Chinese Second Office Action dated Mar. 6, 2009 in 200510126798.5.

European Search Report dated Mar. 11, 2009 in EP 05111550.9.

Chinese Second Office Action dated Mar. 13, 2009 in 200480001395.1 (308874.04), pp. 1-7.

Chinese Second Office Action dated Mar. 27, 2009 in 20040001339.08 (304846.04), pp. 1-7.

Chinese Decision on Rejection dated Mar. 27, 2009 in 200480001336.4 (308877.04), pp. 1-17.

Chinese Decision on Rejection dated May 8, 2009 in 200510125059.04 (60001.0441CC01), pp. 1-14.

Chinese Third Office Action dated Jun. 5, 2009 in 200510126789.6 (60001.0443CC01), pp. 1-7.

Russian Official Action dated Jan. 13, 2008 in 2412-139543RU/8132 (304698.10), pp. 1-9.

European Communication dated Jul. 10, 2009 in Ep 05111511.1—1527, pp. 1-5.

Gudgin, M., "Soap Version 1.2 Part 1: Messaging Framework", W3C Candidate Recommendation (Dec. 19, 2002), pp. 1-65.

Chinese Second Office Action dated Jun. 5, 2009 in 200480001312.9, pp. 1-9.

Chinese Third Office Action dated Jul. 17, 2009 in 200480001395.01, pp. 1-7.

Adobe Creative Team, "Adobe Acrobat 5.0 Classroom in a Book", published Jun. 26, 2001, Adobe Press, pp. 1- 26+cover page (27 pp.).

* cited by examiner

FILE FORMATS, METHODS, AND COMPUTER PROGRAM PRODUCTS FOR REPRESENTING WORKBOOKS

CROSS-REFERENCE TO RELATED APPLICATIONS

This patent application is related to and filed with U.S. patent application, Ser. No. 11/018,718, entitled "File Formats, Methods, and Computer Program Products For Representing Documents," filed on Dec. 20, 2004; U.S. patent application Ser. No. 11/018,910, entitled "File Formats, Methods, and Computer Program Products For Representing Presentations," filed on Dec. 20, 2004; and Ser. No. 11/018,088, entitled "Management and Use of Data in a Computer-Generated Document," filed on Dec. 20, 2004; all of which are assigned to the Same assignee as this application. The aforementioned patent applications are expressly incorporated herein, in their entirety, by reference.

TECHNICAL FIELD

The present invention generally relates to file formats, and more particularly, is related to methods and file formats for representing features and data of workbooks in a componentized spreadsheet application program.

BACKGROUND

The information age has facilitated an era of building informative spreadsheets utilizing spreadsheet software applications. However, the organization of features and data within previous spreadsheet file formats is very confusing and unclear to outside programmers and developers. For instance, previous spreadsheet file formats are created in the form of a single file using a binary record format containing all of the information required to render workbooks. Because proprietary formats are generally used to create these single files, writing code to work with and access these file formats without using the application program that created the file format is a nightmare for professional developers.

Another problem is basic document or worksheet re-use. For instance, it is very difficult to extract one or more worksheets from a workbook file and reuse the extracted worksheets in a different workbook and retain worksheet integrity, even in the same application. Comparatively, reusing worksheets between different applications is worse. Reusing content on a worksheet, for example reusing a table from EXCEL to WORD, is similarly difficult.

Additionally, because of the single file format, it is practically impossible to lock part of a workbook. Most of the technology in terms of file locking is all done at the file level, thus if a file is locked by a user, no other users can edit the file. Viewing is possible, but not editing.

There is also a problem of document interrogation. Finding content within a workbook file, for example finding worksheets for a 2004 sales forecast, can be a daunting task. It is difficult to write code that programmatically finds cell A1 of a spreadsheet file and determines the contents of that cell (a string value, a formula, a calculated result) without using the same spreadsheet application that created the workbook. It is also very difficult to find parts of a single file format presentation and determine semantics about the content. For example, it is difficult to write code that programmatically locates a list of data in a spreadsheet application, and adds 3 rows of data to the list without using that spreadsheet application.

It is still difficult to implement reader and writer classes that can handle existing binary file formats well. Even if a tool targeted at an application was developed it could not interrogate all document formats. This problem is referred to as the opaqueness of single file formats.

Still further, due to intermingling of data, the ability to re-brand a worksheet, or multiple worksheets, is nearly impossible outside of the same spreadsheet application. Re-branding a worksheet involves taking a worksheet from workbook A, moving it to workbook B, and making the worksheet look as though it was authored in the normal authoring context of workbook B having the same text-based format.

Document surfacing, the ability to take pieces of a worksheet document and drop them into another document of a different application, is also a problem. For instance, a spreadsheet table copied into a presentation document is difficult to interrogate in the single file format.

Accordingly there is an unaddressed need in the industry to address the aforementioned deficiencies and inadequacies.

SUMMARY

Embodiments of the present invention provide file formats, methods, and computer program products for representing a workbook in a modular content framework implemented within a computing apparatus Embodiments of the present invention disclose an file format based on open standards, such as an extensible markup language (XML) file format and/or a binary file format, and a method by which features and data of a workbook are organized and modeled within a spreadsheet application file. The file format is designed such that it is made up of collections and parts. Each collection functions as a folder and each modular part functions as a file. These separate files are related together with relationships where each separate file is associated with a relationship type. This design greatly simplifies the way the spreadsheet applications organizes workbook features and data, and presents a logical model that is much less confusing.

One embodiment is a file format for representing a workbook in a modular content framework. The modular content framework may include a file format container associated with the modular parts. The file format includes modular parts that are logically separate but associated with one another by one or more relationships. Each modular part is associated with a relationship type and the modular parts include a workbook part operative as a guide for properties of the workbook. The modular parts also include a worksheet part associated with the workbook part and operative to specify a definition of cells within a worksheet, a sheet part containing data associated with a macro sheet, a chart sheet part containing data associated with defining a chart, and/or a dialog sheet part containing data associated With workbook dialog. Each modular part is capable of being interrogated separately with or without the spreadsheet application and without other modular parts being interrogated, which offers gains in efficiency when the workbook is queried.

The modular parts may also include a document properties part containing built-in properties associated with the file format and a thumbnail part containing one or more thumbnails associated with the file format. Each modular part is capable of being extracted from and/or copied from the workbook and reused in a different workbook along with associated modular parts identified by traversing the relationships of the modular part reused.

Another embodiment is a method for representing a workbook in a file format wherein modular parts associated with the workbook include each part written into the file format. The method involves writing a workbook part of the file format, querying the workbook for a worksheet relationship type, and writing a worksheet part of the file format separate from the workbook part. The method also involves establishing a relationship between the worksheet part and the workbook part. Additionally, the method may involve establishing a relationship between the workbook part and a file format container where the file format container includes a document properties part containing built-in properties associated with the file format and a thumbnail part containing a thumbnail associated with the file format.

Still further, the method may involve writing modular parts associated with relationship types wherein the modular parts that are to be shared are written only once, and establishing relationships to the modular parts written. Writing the modular parts may also involve examining data associated with the workbook, determining whether the data examined has been written to a modular part, and when the data examined has not been written to the modular part, writing the modular part to include the data examined.

Still another embodiment is a computer program product including a computer-readable medium having control logic stored therein for causing a computer to represent a workbook in a file format where modular parts of the file format include each part written into the file format. The control logic includes computer-readable program code for causing the computer to write a workbook part of the file format, query the workbook for a worksheet relationship type, write a worksheet part of the file format separate from the workbook part, and establish a relationship between the worksheet part and the workbook part.

The invention may be implemented utilizing a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION

Figure 1:
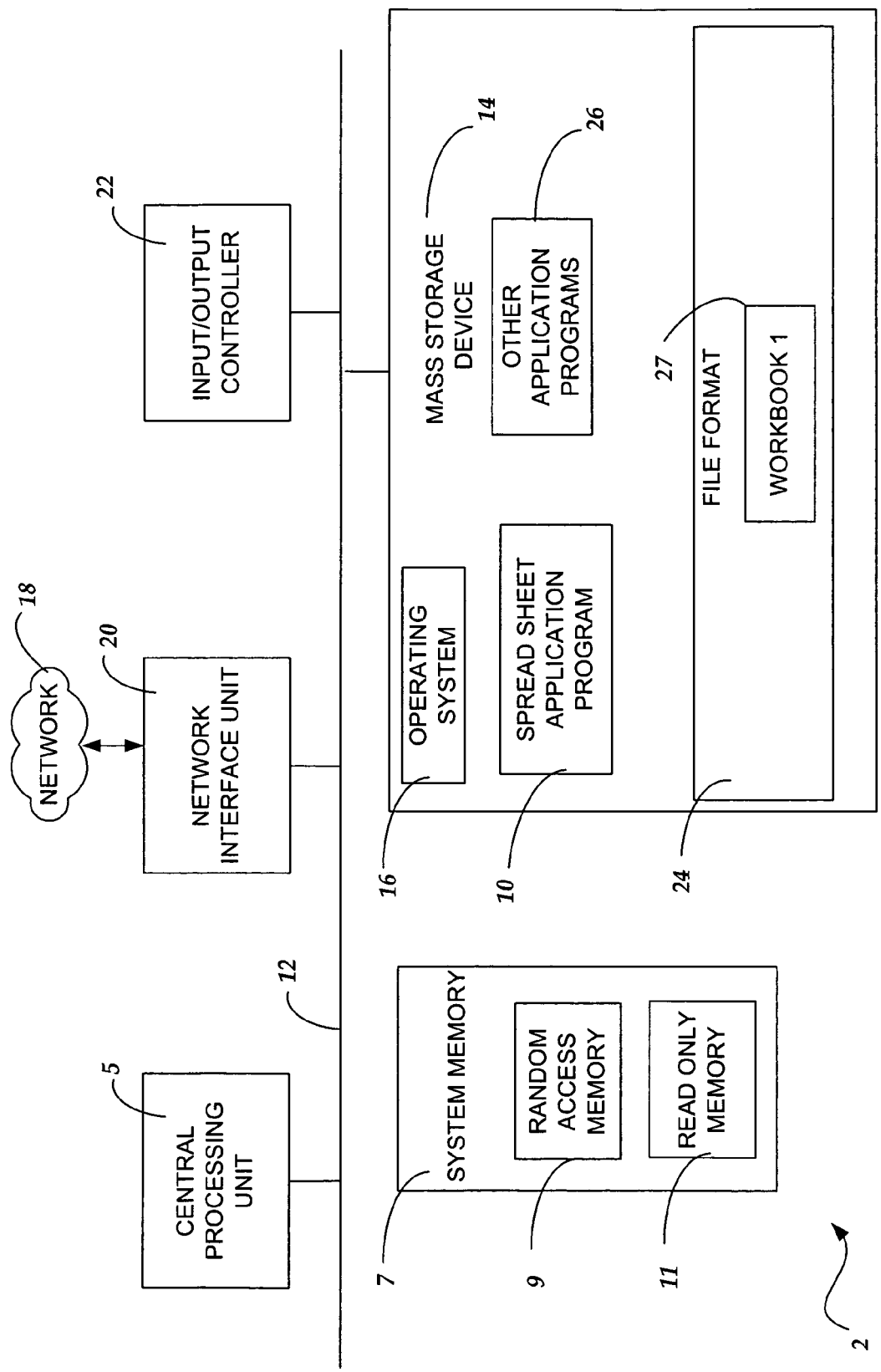
FIG. 1 is a computing system architecture illustrating a computing apparatus utilized in and provided by various illustrative embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, operations, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in an embodiment of the invention will be described. The computer architecture shown in FIG. 1 illustrates a computing apparatus, such as a server, desktop, laptop, or handheld computing apparatus, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during start-up, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVJS'), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a spreadsheet application program 10. The spreadsheet application program 10 is operative to provide functionality for the creation and structure of workbooks, such as a workbook 27, in an open file format 24, such as an XML file format. According to one embodiment of the invention, the spreadsheet application program 10 and other application programs 26 comprise the OFFICE suite of application programs from MICROSOFT CORPORATION including the WORD, EXCEL, and POWERPOINT application programs.

Embodiments of the present invention greatly simplify and clarify the organization of workbook features and data. The spreadsheet program 10 organizes the 'parts' of a workbook file (features, data, themes, styles, objects, etc) into logical, separate pieces, and then expresses relationships among the separate parts. These relationships, and the logical separation of 'parts' of a workbook, make up a new file organization that can be easily accessed, such as by a developer's code, without using the spreadsheet application itself.

Figure 2A:
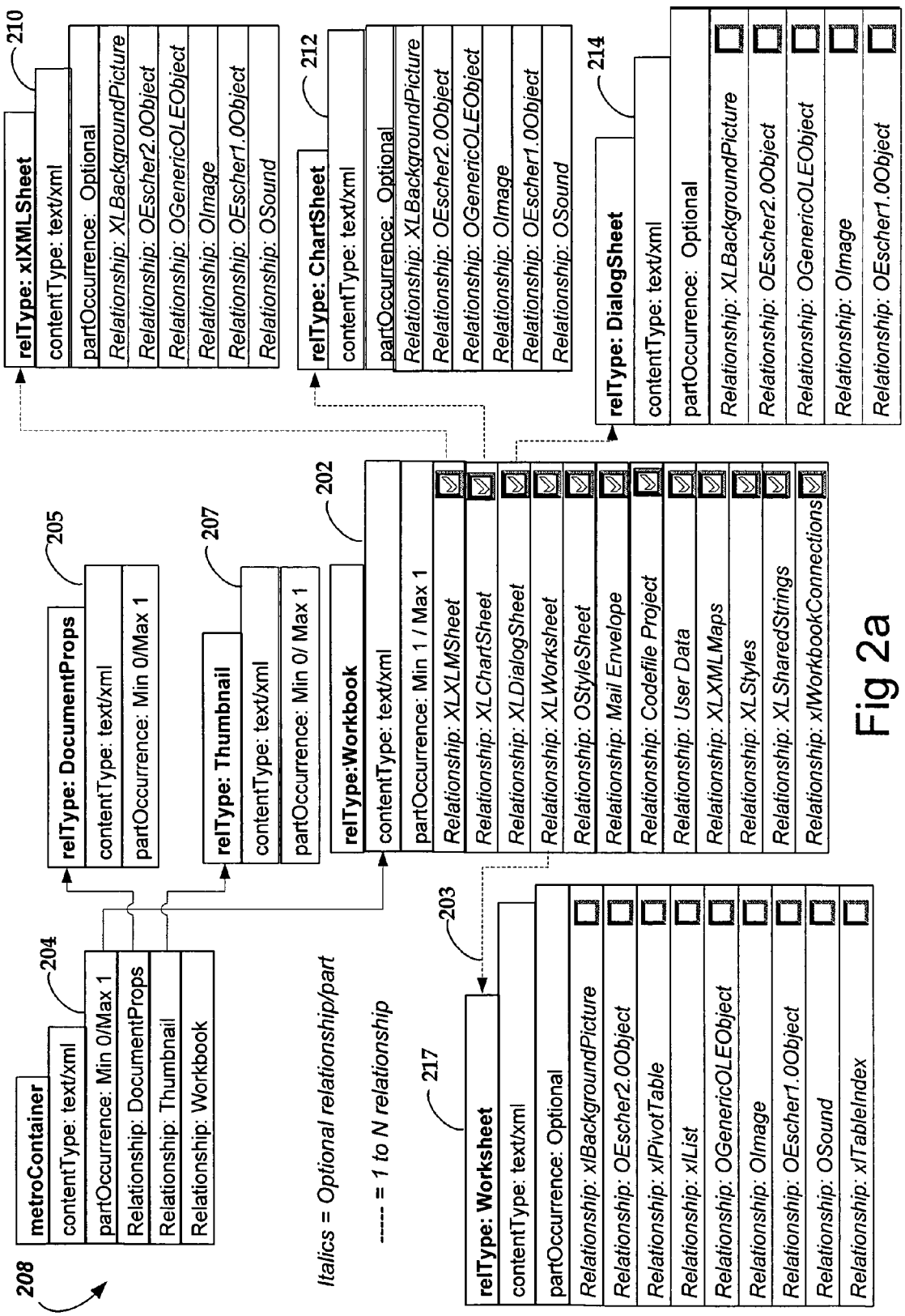
FIGS. 2a-2c are block diagrams illustrating a workbook relationship hierarchy for various modular parts utilized in a file format for representing a workbook according to various illustrative embodiments of the invention.
Figure 2B:
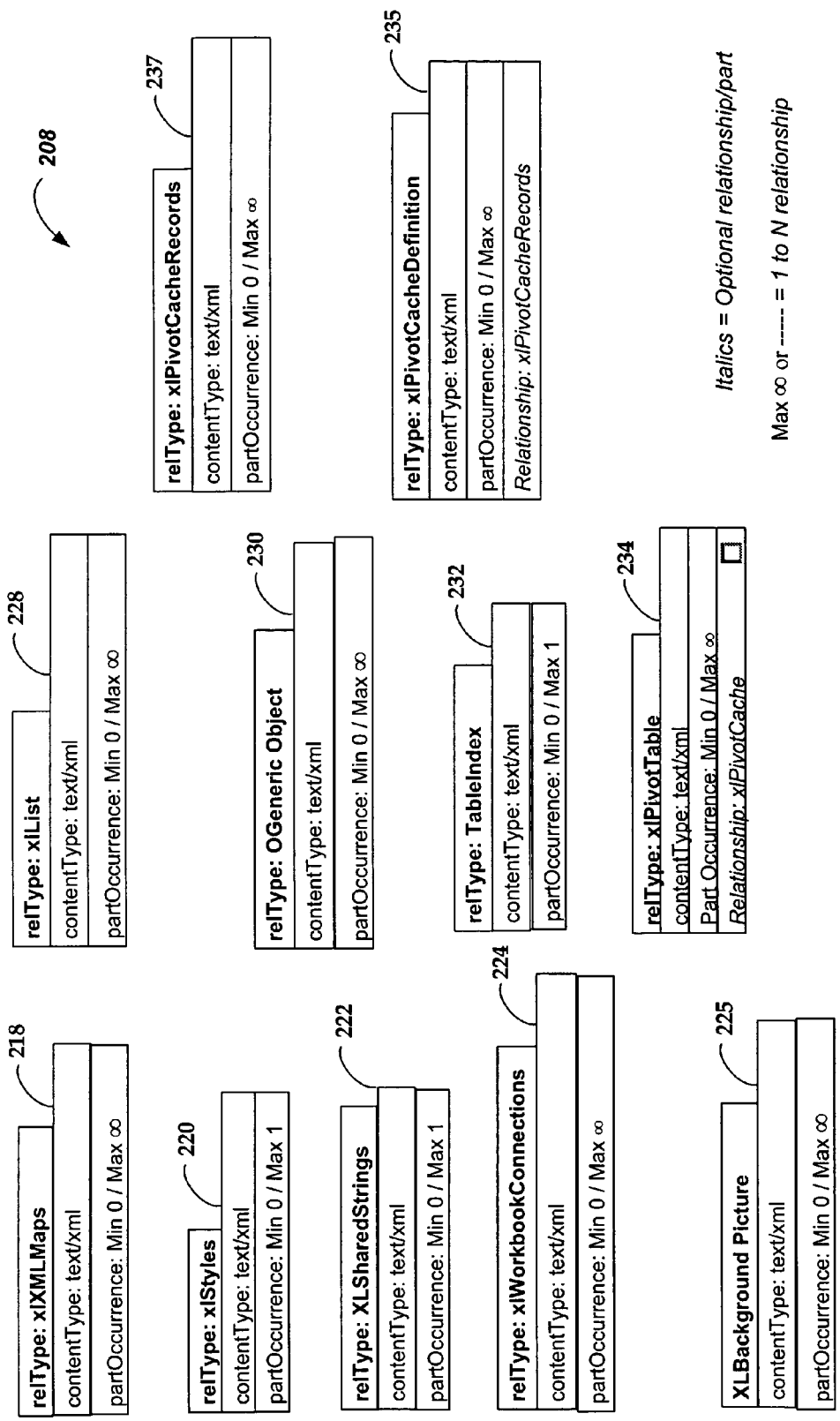
Figure 2C:
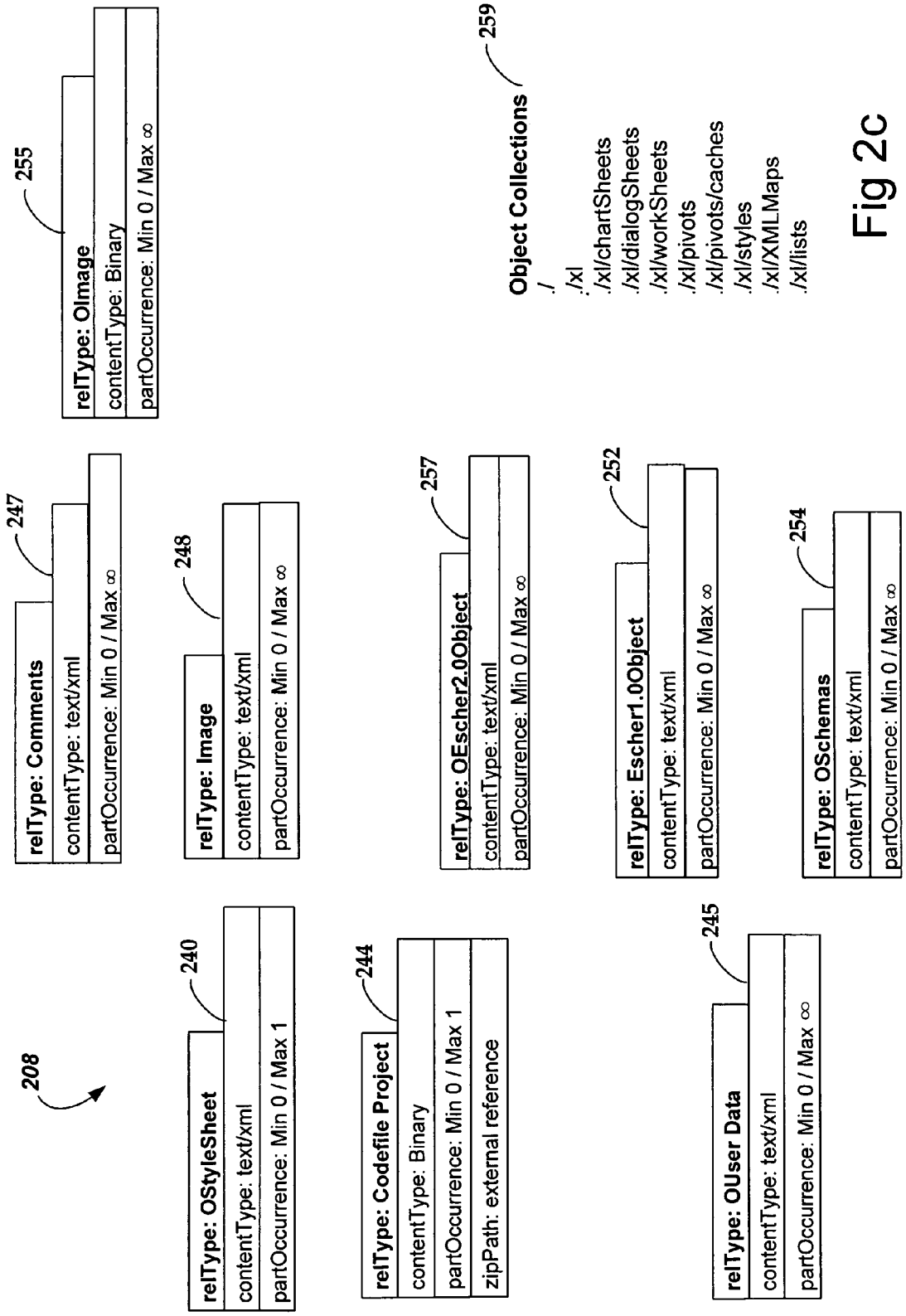

Referring now to FIGS. 2*a*-2*c*, block diagrams illustrating a workbook relationship hierarchy for various modular parts utilized in the file format 24 for representing a workbook according to various illustrative embodiments of the invention will be described. The workbook relationship hierarchy 208 lists specific spreadsheet application relationships. Optional relationships with respect to validation are indicated in italics, and dashed connecting lines 203 indicate a one to potentially many relationship. Thus, for example there is a worksheet part 217 for each worksheet associated with a workbook 202.

The various modular parts or components of the presentation hierarchy 208 are logically separate but are associated by one or more relationships. Each modular part is also associated with a relationship type and is capable of being interrogated separately with or without the spreadsheet application program 10 and/or with or without other modular parts being interrogated. Thus, for example, it is easier to locate the contents of a worksheet cell because instead of searching through all the binary records for cell information, code can be written to easily inspect the relationships in a workbook and find the worksheet parts, effectively ignoring the other features and data in the file format 24. Thus, the code is written to step through the cells in a much simpler fashion than previous interrogation code. Further, 'authoring' scenarios, where a developer writes code to insert a new part, or to insert a completely new file without running the spreadsheet application, are simplified due to the modular part file format.

A modular content framework may include a file format container 204 associated with the modular parts. The modular parts include, the workbook part 202 operative as a guide for properties of the workbook and the worksheet part 217 associated with the workbook part 202 and operative to specify a definition of cells within a worksheet associated with the worksheet part 217. The workbook hierarchy 208 may also include a document properties part 205 containing built-in properties associated with the file format 24, and a thumbnail part 207 containing a thumbnail associated with the file format 24.

The modular parts also include a sheet part 210 containing data associated with a macro sheet, a chart sheet part 212 containing data associated with defining a chart, and a style sheet part 240 representing a theme in the workbook. It should be appreciated that each modular part is capable of being extracted from or copied from the workbook and reused in a different workbook along with associated modular parts identified by traversing relationships of the modular part reused. Associated modular parts are identified when the spreadsheet application 10 traverses inbound and outbound relationships of the modular part reused.

Other modular parts may include a style part 220 containing data associated with a style at a cell level in the workbook, a dialog sheet part 214 containing data associated with workbook dialog, a markup maps part 218 containing visuals depicting a markup language format associated with the workbook, and a shared strings part 222 containing a string associated with a plurality of cells in the workbook. Still other modular parts include a workbook connections part 224 containing data associated with interfacing with the workbook, a background picture part 225, a mail envelope part 242 containing envelope data where a user of the workbook has sent the workbook via electronic mail, a code file part 244 containing code associated with the workbook, and a comments part 247 containing comments associated with the workbook.

Still further, the modular parts may include a schemas part 254 containing schemas associated with the markup maps part 218, an image part 248 containing image data associated with the workbook, an image part 255 formatted according to a binary format, and an embedded object part 230 containing an object associated with the workbook. Other modular parts may also include a user data part 245 containing customized data capable of being read into the workbook and changed, a drawing object part 257 containing an object built using a drawing platform, a legacy drawing object part 252, such as an Escher 1.0 object, a table index part 232 containing data defining a table index associated with the worksheet, and a list part 228 containing data defining a list associated with the worksheet. As an example, embodiments of the present invention make it easier to locate a list in a workbook because any list has a list part 228 separate in the file format 24 with corresponding relationships expressed. The list part 228, as are other modular parts, is logically broken-out and separate from other features & data of the workbook. Further, because the logical structure of a list is clearly understood, it is also less complicated to add more rows of data to a list.

Other modular parts associated with the workbook may include a pivot table part 234 containing data defining a pivot table associated with the worksheet, a pivot cache definition part 235 containing data defining a cache associated with the pivot table, and a pivot cache records part 237 containing data associated with the pivot cache definition part. A pivot table is a program tool that allows selected columns and rows of data in a spreadsheet or database table to be reorganized and summarized in order to obtain a desired report. A pivot table turns the data to view it from different perspectives. It should be appreciated that modular parts that are shared in more than one relationship are typically only written to the file once. It should also be appreciated that certain modular parts are global and thus, can be used anywhere in the file format. In contrast, some modular parts are non-global and thus, can only be shared on a limited basis.

In various embodiments of the invention, the file format 24 may be formatted according to extensible markup language ("XML") and/or a binary format. As is understood by those skilled in the art, XML is a standard format for communicating data. In the XML data format, a schema is used to provide XML data with a set of grammatical and data type rules governing the types and structure of data that may be communicated. The XML data format is well-known to those skilled in the art, and therefore not discussed in further detail herein. The XML formatting closely reflects the internal memory structure of an entire workbook. Thus, an increase in load and save speed is evident.

Embodiments of the present invention make workbooks more programmatically accessible. This enables a significant number of new uses that are simply too hard for previous file formats to accomplish. For instance, utilizing embodiments of the present invention, a server-side program is able to create a workbook for someone based on their input. For example, creating an analysis report on Company A for the time period of Jan. 1, 2004-Dec. 31, 2004 where all variable input is italicized.

Other examples include, an external process scanning and rewriting all workbooks on a network in order to update a company logo and visual color scheme, a chart in one workbook being programmatically copied and inserted into another workbook, and calculation results being retrieved from a workbook and updated to a database nightly. Still another example is a government agency can process workbooks, and more easily convert the features and data to their internal text-based format.

FIGS. 2a-2c also include relationship types utilized in the file format 24 according to various illustrative embodiments of the invention. The relationship types associated with the modular parts not only identify an association or dependency but also identify the basis of the dependency. The relationship types include the following: a code file relationship capable of identifying code files, a user data relationship, a style sheet relationship, a comments relationship, an embedded object relationship, a drawing object relationship, an image relationship, a sound relationship, a mail envelope relationship, a document properties relationship, a thumbnail relationship, a schema relationship, a chart sheet relationship, a dialog sheet relationship, a worksheet relationship, and a pivot table relationship, a shared string relationship, a lists relationship, a pivot cache relationship, a styles relationship, a markup maps relationship, and a pivot cache metadata relationship Referring to FIG. 2c also illustrates the listing 259 that lists collection types for organizing the modular parts. The collection types include a chart sheet collection including the chart sheet part 212, a dialog sheet collection including the dialog sheet part 214, a worksheets collection including the worksheet part 217, a pivots collection including the pivot table part 234, and a pivot cache collection including the pivot cache definition part 235 and the pivot cache records part 237. The collection types also include a styles collection including the styles sheet part 240 and the styles part 220, a markup maps collection including the markup maps part 218, a lists collection including the lists part 228, and an embeddings collection including the embedded object part 230 and the user data part 245.

Figure 3:
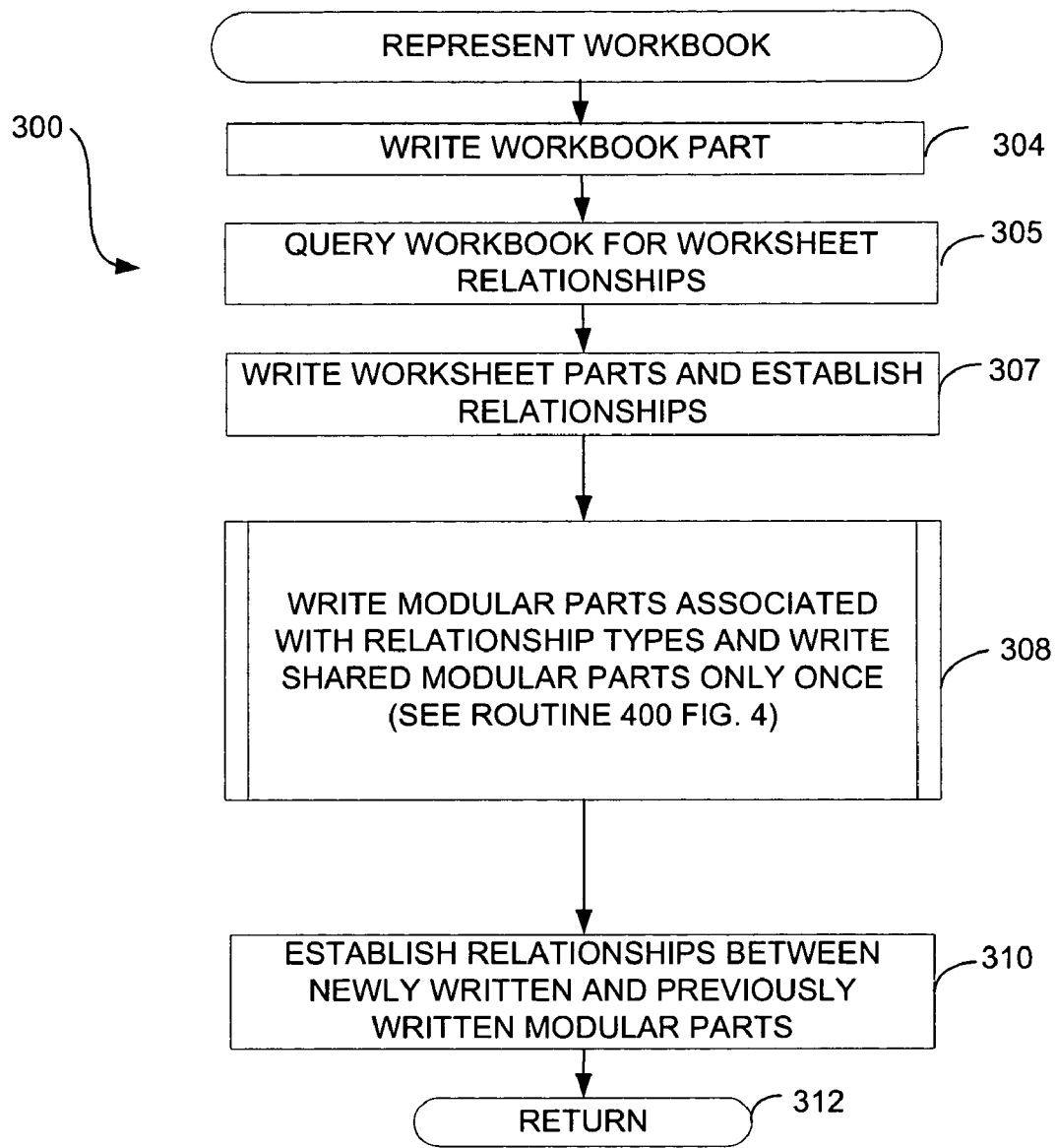
FIGS. 3-4 are illustrative routines performed in representing workbooks in a modular content framework according to illustrative embodiments of the invention.
Figure 4:
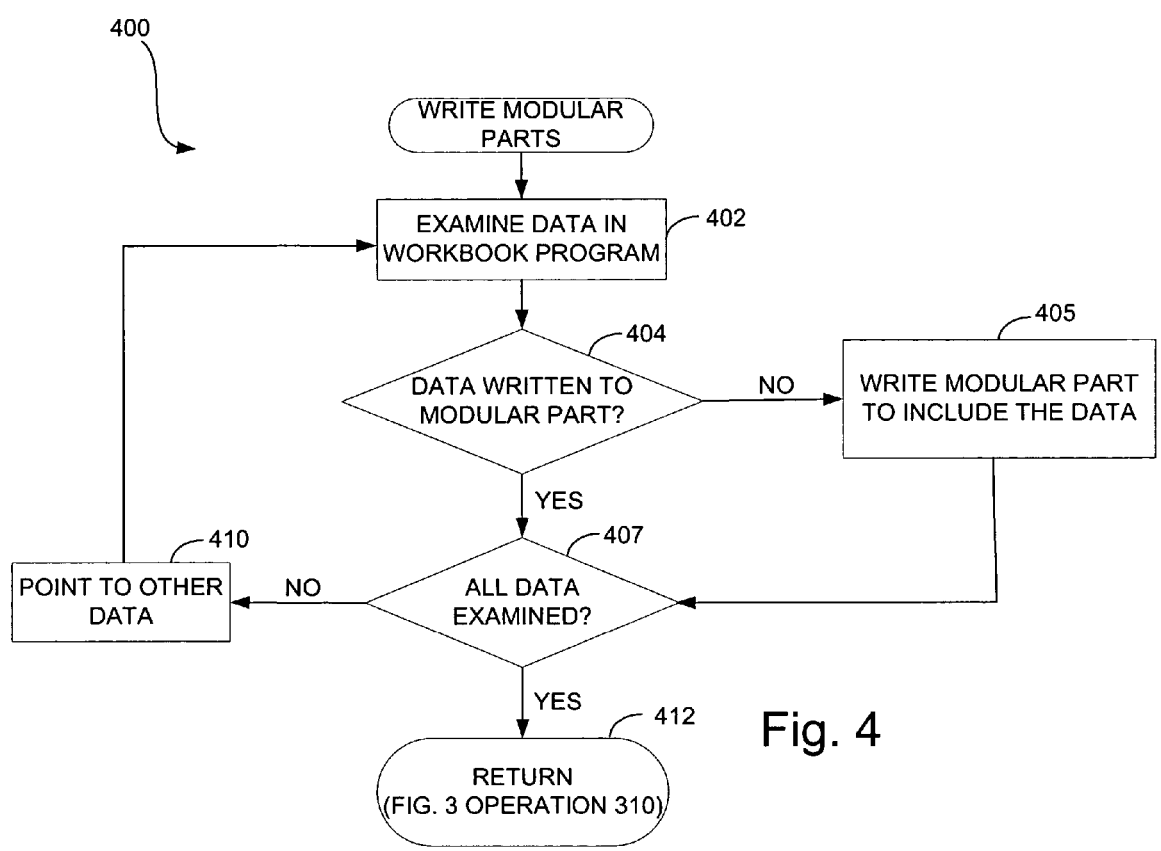

FIGS. 3-4 are illustrative routines performed in representing workbooks in a modular content framework according to illustrative embodiments of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3-4, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIGS. 2a-2c and 3, the routine 300 begins at operation 304, where the spreadsheet application program 10 writes the workbook part 202. The routine 300 continues from operation 304 to operation 305, where the spreadsheet application program 10 queries the workbook for worksheet relationships. Next, at operation 307, the spreadsheet application writes the worksheet parts 217 referenced in the workbook part 202 and establishes relationships between each worksheet part 217 and the workbook part 202.

Next, at operation 308, the spreadsheet application 10 writes other modular parts associated with relationship types, such as the image part 248, and the schema part 254. Any modular part to be shared between other modular parts is written only once. The routine 300 then continues to operation 310.

At operation 310, the spreadsheet application 10 establishes relationships between newly written and previously written modular parts. The routine 300 then terminates at return operation 312.

Referring now to FIG. 4, the routine 400 for writing modular parts will be described. The routine 400 begins at operation 402 where the spreadsheet application 10 examines data in the spreadsheet application. The routine 400 then continues to detect operation 404 where a determination is made as to whether the data has been written to a modular part. When the data has not been written to a modular part, the routine 400 continues from detect operation 404 to operation 405 where the spreadsheet application writes a modular part including the data examined. The routine 400 then continues to detect operation 407 described below.

When at detect operation 404, if the data examined has been written to a modular part, the routine 400 continues from detect operation 404 to detect operation 407. At detect operation 407 a determination is made as to whether all the data has been examined. If all the data has been examined, the routine 400 returns control to other operations at return operation 412. When there is still more data to examine, the routine 400 continues from detect operation 407 to operation 410 where the spreadsheet application 10 points to other data. The routine 400 then returns to operation 402 described above.

Based on the foregoing, it should be appreciated that the various embodiments of the invention include file formats, methods and computer program products for representing workbooks in a modular content framework. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having encoded thereon a file format representative of a workbook within a spreadsheet application, the file format representing the workbook in a modular content framework implemented within a computing apparatus, the computer apparatus being operative to:

establish a relationship between a plurality of logically separate modular parts associated with at least the workbook within the spreadsheet application, wherein the relationship is within a relationship hierarchy for the plurality of logically separate modular parts, the hierarchy comprising at least one indication of optional relationships with respect to validation and at least one indication of a one to many relationship, wherein each modular part is associated with a relationship type, wherein at least one of the plurality of logically separate modular parts is a global modular part used without limitation in the file format, wherein at least one of the plurality of logically separate modular parts is a non-global modular part which is shared on a limited basis in the file format, and wherein the modular parts include:

a workbook part operative as a guide for properties of the workbook; and at least one of the following:

a worksheet part associated with the workbook part and operative to specify a definition of cells within a worksheet associated with the worksheet part;

a sheet part containing data associated with a macro sheet;

a chart sheet part containing data associated with defining a chart;

a dialog sheet part containing data associated with workbook dialog; and interrogate each modular part separately without the spreadsheet application and without other modular parts being interrogated to facilitate locating the contents of a worksheet cell within the spreadsheet application, wherein each modular part is one of extracted from and copied from the workbook and reused in a different workbook along with associated modular parts identified by traversing inbound and outbound relationships of the modular part reused.

2. The computer-readable storage medium of claim 1, wherein the modular content framework includes a file format container associated with the modular parts wherein the modular parts further include:

a document properties part containing properties associated with the file format; and a thumbnail part containing thumbnails associated with the file format.

3. The computer-readable storage medium of claim 1, wherein the modular parts further include at least one of the following:

a style sheet part representing a theme in the workbook;

a style part containing data associated with a style at a cell level in the workbook;

a comments part containing comments associated with the workbook;

a markup maps part containing visuals depicting a markup language format associated with the workbook;

a schemas part containing schemas associated with the markup maps part;

a shared strings part containing a string associated with a plurality of cells in the workbook;

a workbook connections part containing data associated with interfacing with the workbook;

a mail envelope part containing envelope data where a user of the workbook has sent the workbook via electronic mail; and a code file part containing code associated with the workbook.

4. The computer-readable storage medium of claim 3, wherein the modular parts further include at least one of the following:

an image part containing image data associated with the workbook;

an embedded object part containing an object associated with the workbook;

a user data part containing customized data capable of being read into the workbook and changed; and a drawing object part containing an object built using a drawing platform.

5. The computer-readable storage medium of claim 4, wherein the modular parts further include at least one of the following:

a table index part containing data defining a table index associated with the worksheet;

a list part containing data defining a list associated with the worksheet;

a pivot table part containing data defining a pivot table associated with the worksheet;

a pivot cache definition part containing data defining a cache associated with the pivot table; and a pivot cache records part containing data associated with the pivot cache definition part.

6. The computer-readable storage medium of claim 5, wherein at least some of the modular parts are organized in collection types and wherein the collection types include at least one of the following:

a chart sheet collection including the chart sheet part;

a dialog sheet collection including the dialog sheet part;

a worksheets collection including the worksheet part;

a pivots collection including the pivot table part;

a pivot cache collection including at least one of the pivot cache definition part and the pivot cache records part;

a styles collection including at least one of the styles sheet part and the styles part;

a markup maps collection including the markup maps part;

a lists collection including the lists part; and an embeddings collection including at least of the embedded object part and the user data part.

7. The computer-readable storage medium of claim 1, where the relationship types associated with the modular parts comprises at least one of a code file relationship capable of identifying code files, a user data relationship, a hyperlink relationship, a style sheet relationship, a comments relationship, an embedded object relationship, a drawing object relationship, an image relationship, a mail envelope relationship, a document properties relationship, a thumbnail relationship, a schema relationship, a chart sheet relationship, a dialog sheet relationship, a worksheet relationship, and a pivot table relationship, a shared string relationship, a lists relationship, a pivot cache records relationship, a styles relationship, a markup maps relationship, and a pivot cache metadata relationship.

8. The computer-readable storage medium of claim 1, wherein content of the worksheet is one of extracted from and copied from the workbook and reused in a different workbook.

9. The computer-readable storage medium of claim 1, wherein each modular part is locked separately while the other modular parts remain available for locking.

10. The computer-readable storage medium of claim 1, wherein the modular parts provide semantics about content within the workbook when a modular part is interrogated.

11. The computer-readable storage medium of claim 1, wherein at least one of the modular parts is authored in an authoring context of the workbook and wherein the at least one modular part in the workbook is one of extracted from and copied from the workbook and moved to a different workbook and wherein the at least one modular part is further capable of being altered to appear as though the at least one modular part was authored in an authoring context of the different workbook.

12. The computer-readable storage medium of claim 1, wherein the file format is formatted according to at least one of a markup language format and a binary format.

13. A method for representing a workbook in a file format wherein modular parts associated with the workbook include each part written into the file format, comprising:

writing a workbook part of the file format;

querying the workbook part for a worksheet relationship type;

writing a worksheet part of the file format separate from the workbook part; and establishing a relationship between the worksheet part and the workbook part, wherein the relationship is within a relationship hierarchy for the modular parts, the hierarchy comprising at least one indication of optional relationships with respect to validation and at least one indication of a one to many relationship, wherein at least one of the modular parts is a global modular part used without limitation in the file format, wherein at least one of the modular parts is a non-global modular part which is shared on a limited basis in the file format, and wherein each of the modular parts associated with the workbook is one of extracted from and copied from the workbook and reused in a different workbook along with associated modular parts identified by traversing inbound and outbound relationships of the modular part reused.

14. The method of claim 13, further comprising establishing a relationship between the workbook part and a file format container wherein the file format container includes at least one of the following:

a document properties part containing properties associated with the file format; and a thumbnail part containing a thumbnail associated with the file format.

15. The method of claim 13, further comprising:

writing other modular parts associated with relationship types wherein the other modular parts that are to be shared are written only once; and establishing relationships to the other modular parts written.

16. The method of claim 15, wherein writing the other modular parts associated with the relationship types comprises:

a) examining data associated with the workbook;

b) determining whether the data examined has been written to a modular part;

c) when the data examined has not been written to the modular part, writing the modular part to include the data examined, examining other data associated with the workbook, and repeating b) through c) until all of the data associated with the workbook has been examined; and d) when the data examined has been written to the modular part, examining other data associated with the workbook and repeating b) through d) until all of the data associated with the workbook has been examined.

17. A computer program product comprising a computer-readable storage medium having control logic stored therein for causing a computer to represent a workbook in a file format comprising modular parts associated with the workbook wherein the modular parts of the file format include each part written into the file format, the control logic comprising computer-readable program code for causing the computer to:

write a workbook part of the file format;

query the workbook part for a worksheet relationship type;

write a worksheet part of the file format separate from the workbook part; and establish a relationship between the worksheet part and the workbook part, wherein the relationship is within a relationship hierarchy for the modular parts, the hierarchy comprising at least one indication of optional relationships with respect to validation and at least one indication of a one to many relationship, wherein at least one of the modular parts is a global modular part used without limitation in the file format, wherein at least one of the modular parts is a non-global modular part which is shared on a limited basis in the file format, and wherein each of the modular parts associated with the workbook is one of extracted from and copied from the workbook and reused in a different workbook along with associated modular parts identified by traversing inbound and outbound relationships of the modular part reused.

18. The computer program product of claim 17, wherein the file format comprises at least one of a markup file format written in a markup language and a binary format.

* * * * *

UNITED STATES PATENT AND TRADEMARK OFFICE
CERTIFICATE OF CORRECTION

| | | |
|---|---|---|
| PATENT NO. | : 7,617,444 B2 | |
| APPLICATION NO. | : 11/018912 | |
| DATED | : November 10, 2009 | |
| INVENTOR(S) | : Chad B. Rothschiller et al. | |

It is certified that error appears in the above-identified patent and that said Letters Patent is hereby corrected as shown below:

In column 1, line 17, delete "Same" and insert -- same --, therefor.

Signed and Sealed this
Fifteenth Day of February, 2011

David J. Kappos
*Director of the United States Patent and Trademark Office*